US009140884B2

(12) United States Patent
Lee et al.

(10) Patent No.: US 9,140,884 B2
(45) Date of Patent: Sep. 22, 2015

(54) VOICE COIL MOTOR

(75) Inventors: Seongmin Lee, Seoul (KR); Sangok Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 363 days.

(21) Appl. No.: 13/149,361

(22) Filed: May 31, 2011

(65) Prior Publication Data

US 2011/0291495 A1 Dec. 1, 2011

(30) Foreign Application Priority Data

May 31, 2010 (KR) ........................ 10-2010-0051415

(51) Int. Cl.
*H02K 41/035* (2006.01)
*G02B 17/08* (2006.01)

(52) U.S. Cl.
CPC ............ *G02B 17/08* (2013.01); *H02K 41/0356* (2013.01)

(58) Field of Classification Search
CPC ............ H02K 41/035; H02K 41/0354; H02K 41/0356; G02B 7/04
USPC ........................................ 310/12.16; 359/824
See application file for complete search history.

(56) References Cited

U.S. PATENT DOCUMENTS

| 7,880,982 | B2* | 2/2011 | Otsuki et al. ................... 359/819 |
| 7,932,648 | B2* | 4/2011 | Jung ............................... 310/15 |
| 2006/0138873 | A1 | 6/2006 | Yasuda |
| 2008/0231974 | A1* | 9/2008 | Jung .............................. 359/824 |
| 2008/0247063 | A1* | 10/2008 | Otsuki et al. ................... 359/824 |
| 2009/0141373 | A1 | 6/2009 | Tang |
| 2011/0310501 | A1 | 12/2011 | Min et al. |

FOREIGN PATENT DOCUMENTS

| CN | 101107769 A | 1/2008 |
| CN | 201096947 Y | 8/2008 |
| JP | 2005/128405 A | 5/2005 |
| JP | 2005128405 A * | 5/2005 ............... G02B 7/04 |
| JP | 2006/178291 A | 7/2006 |
| JP | 2008-268476 A | 11/2008 |
| KR | 10-2007-0075459 A | 7/2007 |
| KR | 10-2007-0078540 A | 8/2007 |
| KR | 2007-0109547 A | 11/2007 |

(Continued)

OTHER PUBLICATIONS

Shiraki et al, JP2005128405 Machine Translation, May 2005.*

(Continued)

*Primary Examiner* — Quyen Leung
*Assistant Examiner* — Eric Johnson
(74) *Attorney, Agent, or Firm* — Saliwanchik, Lloyd & Eisenschenk

(57) ABSTRACT

A voice coil motor is disclosed, the motor including: a mover including a bobbin including a first bobbin having a lens secured therein and a plurality of second bobbins intermittently protruded from an upper surface of the first bobbin, and a coil block secured to a periphery of the first bobbin; a stator including a magnet facing the coil block and a yoke securing the magnet; a case including a bottom case formed with the bobbin and an upper case coupled to the bottom case and having a portion that is correspondingly opened to the bobbin; and an elastic member elastically supporting the bobbin, wherein any one of the yoke and the upper case is formed with a rotation prevention unit extended to the plurality of second bobbins in order to prevent the bobbin from rotating.

17 Claims, 5 Drawing Sheets

(56) References Cited

FOREIGN PATENT DOCUMENTS

| KR | 2008-0046818 A | 5/2008 |
| KR | 10-009-0026480 | 3/2009 |
| KR | 10-2009-0026480 A | 3/2009 |
| KR | 10-2010-0106013 A | 1/2010 |

OTHER PUBLICATIONS

Lee, KR1020090026480 Machine Translation, Mar. 2009.*
Freedictionary.com, Face Definition, Dec. 2014.*
Office Action dated Feb. 8, 2013 in Chinese Application No. 201110144207.2, filed May 31, 2011.

* cited by examiner

VOICE COIL MOTOR

CROSS-REFERENCE TO RELATED APPLICATION

This application claims the benefit of Korean Patent Application No. 10-2010-0051415, filed May 31, 2010, the disclosure of which is hereby incorporated by reference herein in its entirety.

BACKGROUND OF THE INVENTION

1. Field of the invention

The present disclosure relates to a voice coil motor.

2. Description of Related Art

Recently, various optical devices such as a miniature digital camera on a mobile phone or a high resolution digital camera have been developed. In a case of a miniature digital camera applied on a mobile phone, a distance between an image sensor and a lens adjusting a magnification and a focus was uncontrollable in a conventional technology. However, an actuator adjusting the distance between the image sensor and the lens such as a voice coil motor has been recently developed to adjust the function.

A voice coil motor uses a repulsive force and an attractive force generated by a magnetic field of a magnet and a magnetic field of coil to adjust a distance between the image sensor and the lens. The voice coil motor includes a bobbin storing the lens and a leaf spring elastically supporting the bobbin, where the lens is mounted to the bobbin using a screw thread formed at an inner surface of the bobbin.

In mounting the lens to the bobbin using a screw thread formed at an inner surface of the bobbin, the bobbin is generated with a rotational force by rotation of the lens, whereby the lens and the bobbin are rotated by the rotational force.

If the bobbin is rotated, a leaf spring of an extremely thin metal plate coupled to the bobbin and elastically supporting the bobbin is simultaneously rotated, and the leaf spring is thereby damaged or bent to the disadvantage of frequently generating a bad assembly of a voice coil motor.

BRIEF SUMMARY

The present invention is directed to provide a voice coil motor configured to inhibit the leaf spring from being damaged or bent by rotation of bobbin and to inhibit generation of bad assembly by disabling the bobbin to rotate when a lens is rotated to be mounted to the bobbin.

Technical problems to be solved by the present disclosure are not restricted to the above-mentioned descriptions, and any other technical problems not mentioned so far will be clearly appreciated from the following description by skilled in the art.

An object of the invention is to solve at least one or more of the above problems and/or disadvantages in a whole or in part and to provide at least the advantages described hereinafter. In order to achieve at least the above objects, in whole or in part, and in accordance with the purposes of the invention, as embodied and broadly described, and in one general aspect of the present invention, there is provided a voice coil motor, comprising: a mover including a bobbin including a first bobbin having a lens secured therein and a plurality of second bobbins intermittently protruded from an upper surface of the first bobbin, and a coil block secured to a periphery of the first bobbin; a stator including a magnet facing the coil block and a yoke securing the magnet; a case including a bottom case formed with the bobbin and an upper case coupled to the bottom case and having a portion that is correspondingly opened to the bobbin; and an elastic member elastically supporting the bobbin, wherein any one of the yoke and the upper case is formed with a rotation prevention unit extended to the plurality of second bobbins in order to inhibit the bobbin from rotating.

In another general aspect of the present disclosure, there is provided a voice coil motor, comprising: a mover including a bobbin including a first bobbin having a lens secured therein, a second bobbin cylindrically protruded from an upper surface of the first bobbin, at least one rotation prevention groove formed from an upper distal end of the second bobbin to the first bobbin, and a coil block secured to a periphery of the first bobbin; a stator including a magnet facing the coil block and a yoke securing the magnet; a case including a bottom case formed with the bobbin and an upper case coupled to the bottom case and having a portion that is opened corresponding to the bobbin; and an elastic member elastically supporting the bobbin, wherein any one of the yoke and the upper case is formed with a rotation prevention unit extended to the rotation prevention groove to contact lateral surfaces of the second bobbin formed by the rotation prevention groove.

BRIEF DESCRIPTION OF THE DRAWINGS

The teachings of the present invention can be readily understood by considering the following detailed description in conjunction with the accompanying drawings, in which.

DETAILED DESCRIPTION

Figure 1:
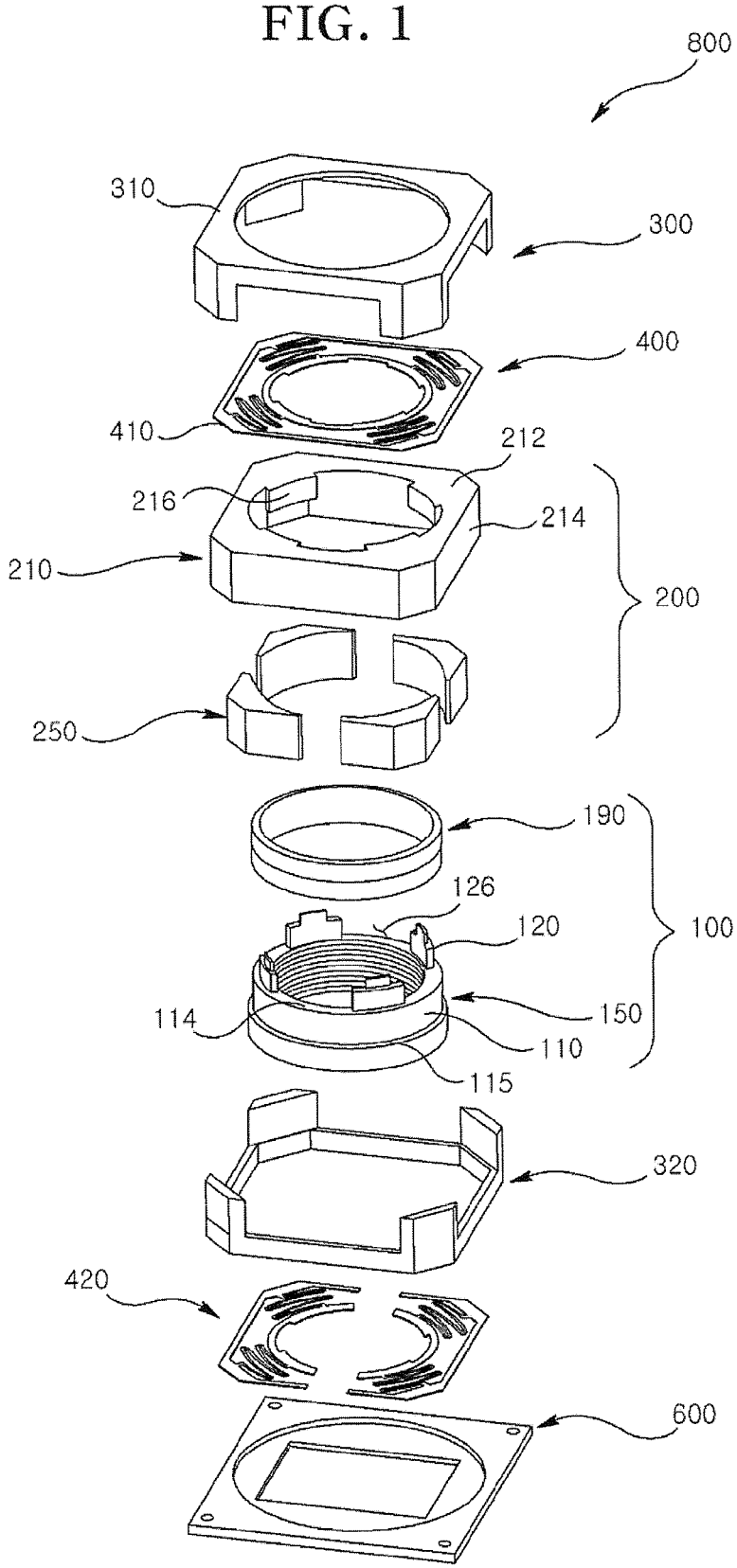
FIG. 1 is an exploded perspective view illustrating a voice coil motor according to a first exemplary embodiment of the present disclosure.

The meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item.

In the drawings, the size and relative sizes of layers and regions may be exaggerated for clarity. Like numbers refer to like elements throughout, and explanations that duplicate one another will be omitted.

Figure 2:
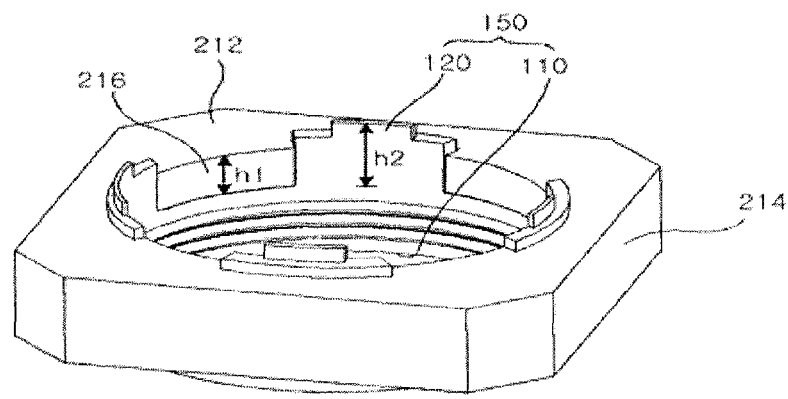
FIG. 2 is a perspective view of an assembled voice coil motor except for a bottom case and an upper case of FIG. 1.
Figure 3:
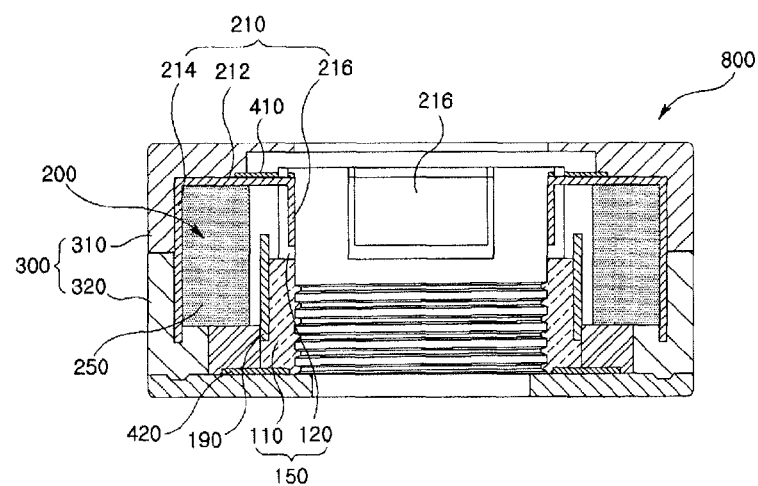
FIG. 3 is a longitudinally-cut out cross-sectional view after the voice coil motor of FIG. 1.
Figure 4:
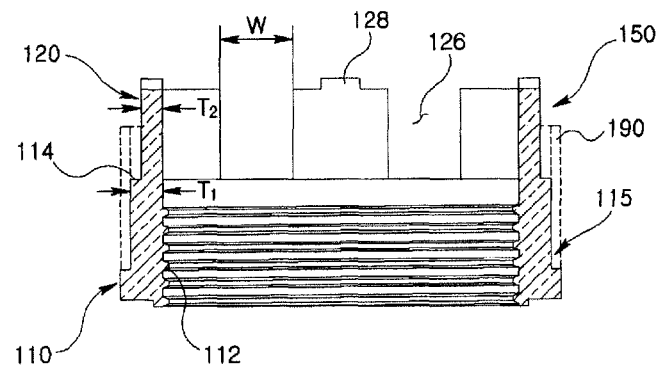
FIG. 4 is a cross-sectional view illustrating a bobbin of FIG. 1.
Figure 5:
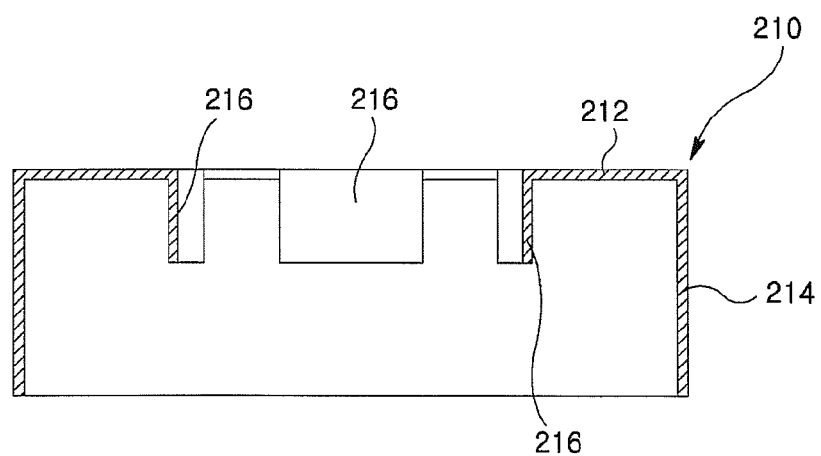
FIG. 5 is cross-sectional view illustrating a yoke of FIG. 1.

Now, the exemplary embodiments of a voice coil motor according to the present disclosure will be explained in detail hereinbelow together with the figures First Exemplary Embodiment FIG. 1 is an exploded perspective view illustrating a voice coil motor according to a first exemplary embodiment of the present disclosure, FIG. 2 is a perspective view of an assembled voice coil motor except for a bottom case and an upper case of FIG. 1, FIG. 3 is a longitudinally-cut out cross-sectional view after the voice coil motor of FIG. 1, FIG. 4 is a cross-sectional view illustrating a bobbin of FIG. 1, and FIG. 5 is cross-sectional view illustrating a yoke of FIG. 1;

Referring to FIGS. 1 to 5, a voice coil motor (800) includes a mover (100), a stator (200), a case (300) and an elastic member (400). In addition, the voice coil motor (800) may further include a base (600). The mover (100) includes a bobbin (150) and a coil block (190). The bobbin (150) includes a first bobbin (110) and a plurality of second bobbins (120).

The first bobbin (110) is formed with a hollow hole to store a lens, and an inner lateral surface of the first bobbin (110) formed by the hollow hole takes the shape of a curvature. For example, the first bobbin (110) may take the shape of a cylinder formed with a hollow hole.

The inner lateral surface of the first bobbin (110) is formed with a female screw unit (112). The female screw unit may be in turn coupled by a lens fixing member (not shown) formed with a male screw unit for securing the lens. The lens fixing member is coupled by the lens. Alternatively, the lens may be directly coupled to the female screw unit (112) of the first bobbin (110).

Referring to FIG. 4, a bottom distal end of periphery of the first bobbin (110) is formed with a sill (115) coupled to the coil block (190, described later). In the first exemplary embodiment, an upper surface (114) of the first bobbin (110) is formed with a first thickness (T1). The second bobbins (120) are formed or arranged on the upper surface (114) of the first bobbin (110). At least two second bobbins (120), preferably four second bobbins (120) are formed on the upper surface (114) of the first bobbin (110). Each second bobbin (120) is formed with a second thickness (T2) thinner than the first thickness (T1).

Each of the second bobbins (120) is intermittently formed on the upper surface (114) of the first bobbin (110) and is equidistant from the other, for example. Alternatively, each of the second bobbins (120) may be distanced from the other at a different distance. A plurality of rotation prevention grooves (126) is formed in the second bobbins (120) intermittently formed on the upper surface (114) of the first bobbin (110), and each rotation prevention groove formed in a pair of second bobbins (120) is formed with a width (W).

Each of the second bobbins (120) formed on the upper surface (114) of the first bobbin (110) takes the shape of a curved plate having a same curvature as that of an inner lateral surface of the first bobbin (110). Meanwhile, an upper surface of each second bobbin (120) is formed with at least one boss (128). The boss (128) is coupled to an elastic member (described later) to allow the bobbin (150) to be elastically support the elastic member (400).

The coil block (190) is arranged on the sill (115) formed at the first bobbin (110), and takes the shape of a cylinder wound by a coil, for example. The coil block (190) arranged on the sill (115) formed on the first bobbin (110) is formed with a height protruded from the upper surface (114) of the first bobbin (110). The coil block (190) is securely coupled to the first bobbin (110). The stator (200) includes a yoke (210) and a magnet (250).

Referring to FIG. 5, the yoke (210) includes an upper plate (212), a lateral surface plate (214) and a rotation prevention plate (216). The upper plate (212) of the yoke (210) takes the shape of a square plate, and is centrally formed with an opening that exposes the second bobbins (120) of the bobbin (150). The lateral plate (214) is extended from and integrally formed with four edges of the upper plate (212). The rotation prevention plate (216) of the yoke (210) is extended from an inner lateral surface formed by the opening of the upper plate (212) to face the lateral surface plate (214). The rotation prevention plate (216) is extended to the pair of second bobbins (120). Both lateral surfaces of the rotation prevention plate (216) extended to the adjacent pair of second bobbins (120) are brought into contact with lateral surfaces of the second bobbins (120).

Because the rotation prevention plate (216) of yoke (210) and the second bobbins (120) are meshed, the bobbin (150) can be inhibited from rotating with the lens when the lens is coupled to the first bobbin (110) for rotation. In the first exemplary embodiment of the present disclosure, the rotation prevention plate (216) of the yoke (210) may be formed at a position corresponding to that of each rotation prevention groove (126) between the adjacent pair of second bobbins (120).

Meanwhile, as illustrated in FIG. 3, a gap for ascending and descending the bobbin (150) is formed between a distal end of the rotation prevention plate (216) and the yoke (210) and the upper surface (114) of the first bobbin (110) facing the distal end of the rotation prevention plate (216). That is, in the first exemplary embodiment, the rotation prevention plate (216) is formed with a first height, and the bobbin (150) is formed with a second height a bit taller than the first height.

Magnets (250) are arranged inside the yoke (210). In the first exemplary embodiment of the present disclosure, each of the magnets (250) is secured to the lateral surface plate (214) of yoke (210) corresponding to the rotation prevention plate (216) of the yoke (210). Each magnet (250) is arranged opposite to the coil block (190).

The bobbin (150) is moved upward by magnetic field generated by each magnet (250) and magnet field generated by the coil block (190). Accurate adjustment of current volume applied to the coil block (190) can accurately adjust a moving distance of the bobbin (150).

The elastic member (400) induces the bobbin (150) moved upwards by the magnet (250) and the coil block (190) to move linearly. In the first exemplary embodiment of the present disclosure, the elastic member (400) includes a first elastic member (410) and a second elastic member (420).

The first elastic member (410) may be a leaf spring including a connection spring unit that connects an inner plate leaf spring unit, an outer leaf spring unit and the inner plate leaf spring unit, and the outer leaf spring unit. The inner leaf spring unit is coupled to a boss (128) formed on upper surface of the second bobbin (120) at the bobbin (150), and the outer lead spring unit is arranged on upper plate (212) of the yoke (210). The outer leaf spring unit is interposed between an upper case (described later) and the upper plate (212) of the yoke (210).

The second elastic member (420) may be a leaf spring including a connection spring unit that connects an inner plate leaf spring unit, an outer leaf spring unit and the inner plate leaf spring unit, and the outer leaf spring unit. One or two second elastic members (420) may be formed in the first exemplary embodiment of the present disclosure.

The inner leaf spring unit of the second elastic member (420) is coupled to a boss protruded from a bottom surface of the first bobbin (110) at the bobbin (150), and the outer leaf spring unit is secured by a base (described later) and a spacer (described later). The second elastic member (420) may be coupled to the first bobbin (110) by way of insertion method. The bobbin (150) mounted with the lens is linearly moved by the first and second elastic members (410, 420).

The case (300) includes an upper case (310) and a bottom case (320). The upper case (310) covers the upper plate (212) of the yoke (210) and includes an opening that exposes the bobbin (150). The bottom case (320) is coupled to the upper case (310). A base (600) is coupled to the bottom case (320), and the second elastic member (420) of the elastic member (400) is interposed between the base (600) and the bottom case (320).

Second Exemplary Embodiment

Figure 6:
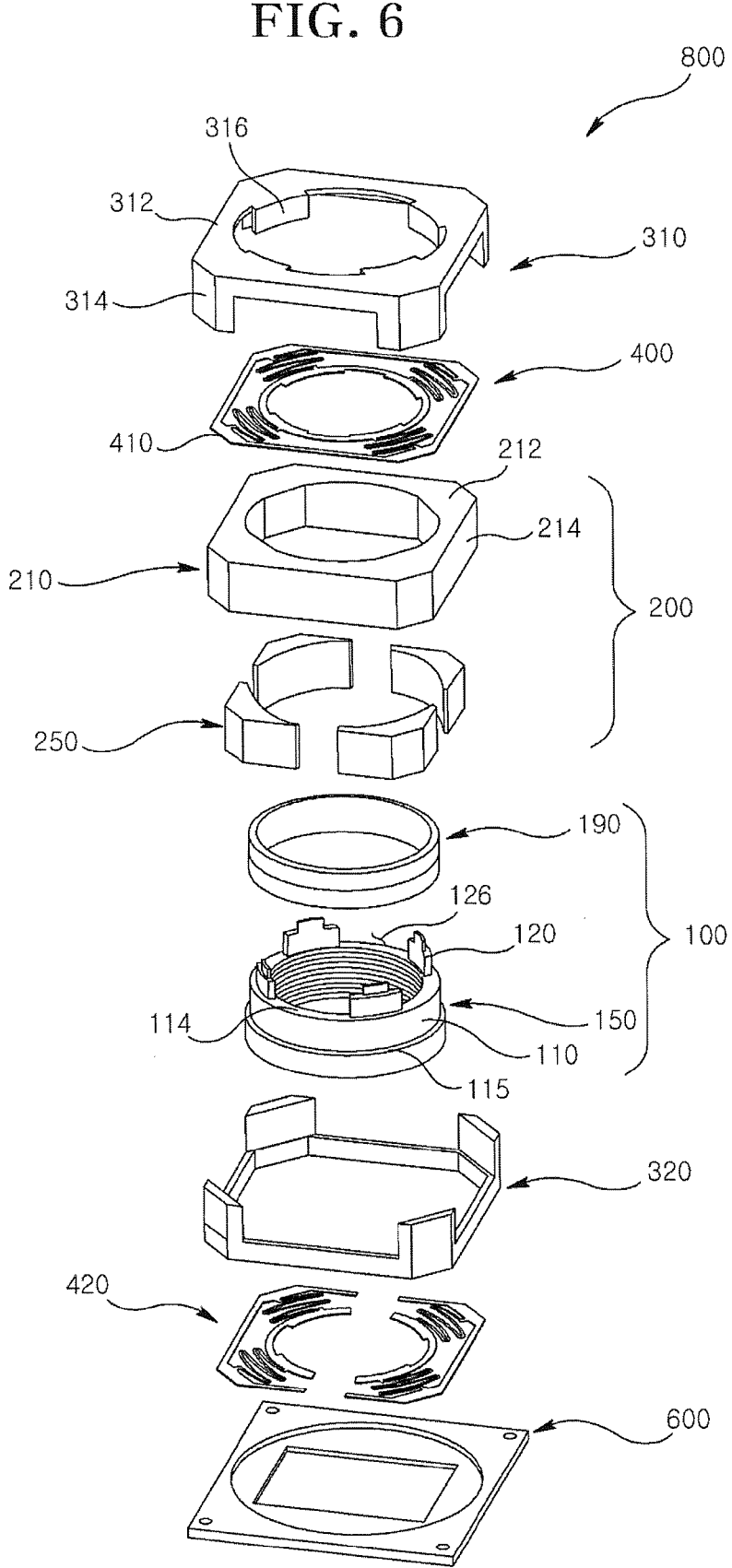
FIG. 6 is an exploded perspective view illustrating a voice coil motor according to a second exemplary embodiment of the present disclosure.
Figure 7:
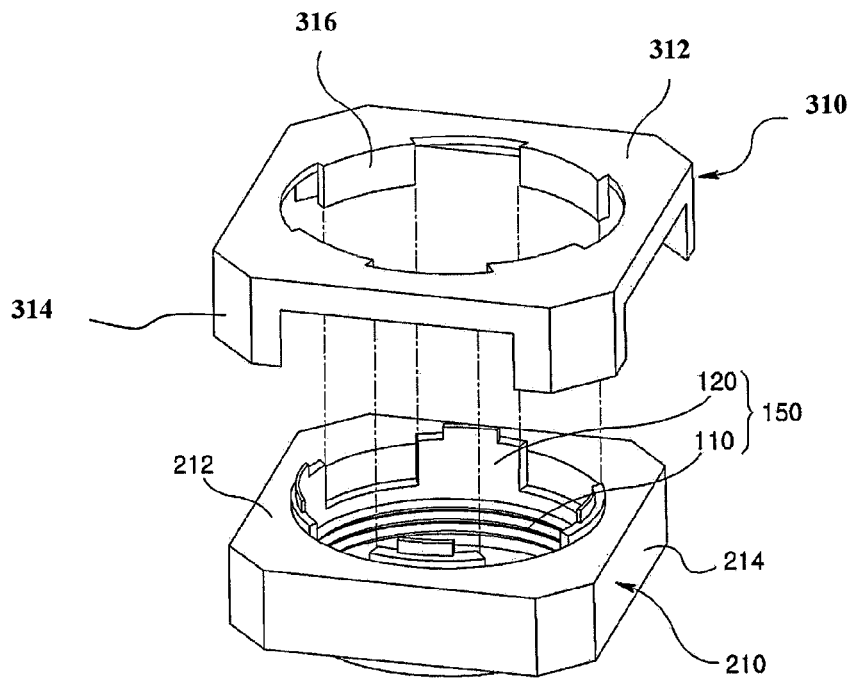
FIG. 7 is an exploded perspective view illustrating a bottom case, a yoke and a bobbin of FIG. 6.
Figure 8:
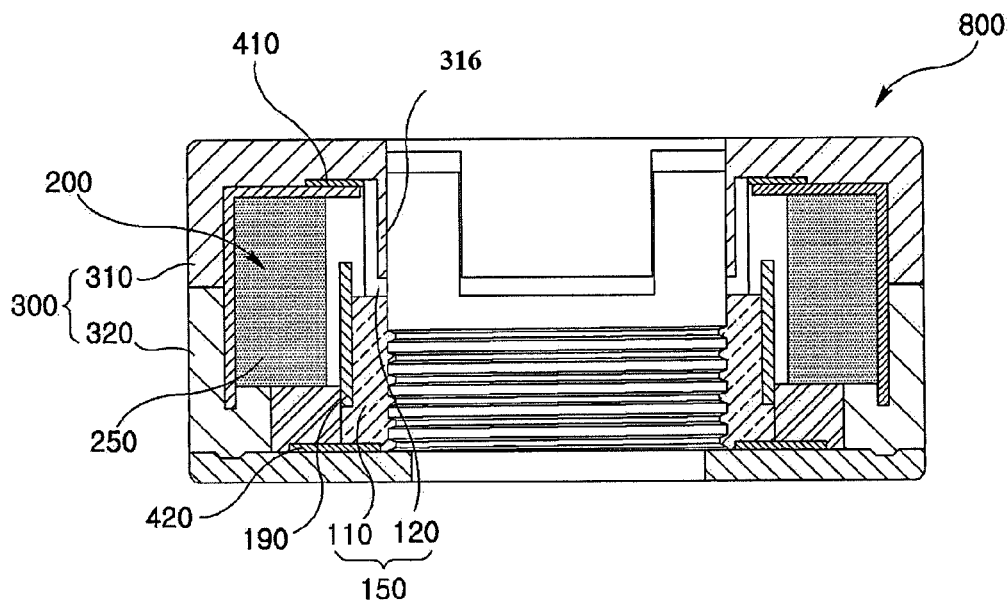
FIG. 8 is a longitudinally-cut out cross-sectional view after the voice coil motor of FIG. 6.

FIG. 6 is an exploded perspective view illustrating a voice coil motor according to a second exemplary embodiment of the present disclosure, FIG. 7 is an exploded perspective view illustrating a bottom case, a yoke and a bobbin of FIG. 6, and FIG. 8 is a longitudinally-cut out cross-sectional view after the voice coil motor of FIG. 6.

Referring to FIGS. 6 to 8, a voice coil motor (800) includes a mover (100), a stator (200), a case (300) and an elastic member (400). In addition, the voice coil motor (800) may further include a base (600). The mover (100) includes a bobbin (150) and a coil block (190). The bobbin (150) includes a first bobbin (110) and a plurality of second bobbins (120).

The first bobbin (110) is formed with a hollow hole to store a lens, and an inner lateral surface of the first bobbin (110) formed by the hollow hole takes the shape of a curvature. For example, the first bobbin (110) may take the shape of a cylinder formed with a hollow hole.

The inner lateral surface of the first bobbin (110) is formed with a female screw unit (112). The female screw unit may be in turn coupled by a lens fixing member (not shown) formed with a male screw unit for securing the lens. The lens fixing member is coupled by the lens. Alternatively, the lens may be directly coupled to the female screw unit (112) of the first bobbin (110).

A bottom distal end of periphery of the first bobbin (110) is formed with a sill (115) coupled to the coil block (190, described later). In the second exemplary embodiment, an upper surface (114) of the first bobbin (110) is formed with a first thickness (T1). The second bobbins (120) are formed or arranged on the upper surface (114) of the first bobbin (110). At least two second bobbins (120), preferably four second bobbins (120) are formed on the upper surface (114) of the first bobbin (110). Each second bobbin (120) is formed with a second thickness (T2) thinner than the first thickness (T1).

Each of the second bobbins (120) is intermittently formed on the upper surface (114) of the first bobbin (110) and is equidistant from the other, for example. Alternatively, each of the second bobbins (120) may be distanced from the other at a different distance. A plurality of rotation prevention grooves (126) is formed in the second bobbins (120) intermittently formed on the upper surface (114) of the first bobbin (110), and each rotation prevention groove formed in a pair of second bobbins (120) is formed with a width (W).

Each of the second bobbins (120) formed on the upper surface (114) of the first bobbin (110) takes the shape of a curved plate having a same curvature as that of an inner lateral surface of the first bobbin (110). Meanwhile, an upper surface of each second bobbin (120) is formed with at least one boss (128). The boss (128) is coupled to an elastic member (described later) to allow the bobbin (150) to be elastically support the elastic member (400).

The coil block (190) is arranged on the sill (115) formed at the first bobbin (110), and takes the shape of a cylinder wound by a coil, for example. The coil block (190) arranged on the sill (115) formed on the first bobbin (110) is formed with a height protruded from the upper surface (114) of the first bobbin (110). The coil block (190) is securely coupled to the first bobbin (110). The stator (200) includes a yoke (210) and a magnet (250).

The yoke (210) includes an upper plate (212) and a lateral surface plate (214). The upper plate (212) of the yoke (210) takes the shape of a square plate, and is centrally formed with an opening that exposes the second bobbins (120) of the bobbin (150). The lateral plate (214) is extended from and integrally formed with four edges of the upper plate (212).

Magnets (250) are arranged inside the yoke (210). In the second exemplary embodiment of the present disclosure, each of the magnets (250) is secured to an inner lateral surface of the lateral surface plate (214) of yoke (210). Each magnet (250) is arranged opposite to the coil block (190).

The bobbin (150) is moved upward by magnetic field generated by each magnet (250) and magnet field generated by the coil block (190). Accurate adjustment of current volume applied to the coil block (190) can accurately adjust a moving distance of the bobbin (150).

The elastic member (400) induces the bobbin (150) moved upwards by the magnet (250) and the coil block (190) to move linearly. In the second exemplary embodiment of the present disclosure, the elastic member (400) includes a first elastic member (410) and a second elastic member (420).

The first elastic member (410) may be a leaf spring including a connection spring unit that connects an inner plate leaf spring unit, an outer leaf spring unit and the inner plate leaf spring unit, and the outer leaf spring unit. The inner leaf spring unit is coupled to a boss (128) formed on upper surface of the second bobbin (120) at the bobbin (150), and the outer lead spring unit is arranged on upper plate (212) of the yoke (210). The outer leaf spring unit is interposed between an upper case (described later) and the upper plate (212) of the yoke (210).

The second elastic member (420) may be a leaf spring including a connection spring unit that connects an inner plate leaf spring unit, an outer leaf spring unit and the inner plate leaf spring unit, and the outer leaf spring unit. One or two second elastic members (420) may be formed in the second exemplary embodiment of the present disclosure.

The inner leaf spring unit of the second elastic member (420) is coupled to a boss protruded from a bottom surface of the first bobbin (110) at the bobbin (150), and the outer leaf spring unit is secured by a base (described later) and a spacer (described later). The second elastic member (420) may be coupled to the first bobbin (110) by way of insertion method. The bobbin (150) mounted with the lens is elastically supported by the first and second elastic members (410, 420).

The case (300) includes an upper case (310) and a bottom case (320). The upper case (310) includes an upper plate (312), a support pillar (314) and a rotation prevention plate (316).

The upper plate (312) of the upper case (310) faces the upper plate (212) of the yoke (210), and the support pillar (314) is arranged at each corner of the upper plate (312). The upper plate (312) of the upper case (310) includes an opening that exposes the bobbin (150).

The rotation prevention plate (316) of the upper case (310) is extended from an inner lateral surface formed by the opening of the upper plate (312) of the upper case (310), and extended to the adjacent pair of second bobbins (120).

In the second exemplary embodiment of the present disclosure, the rotation prevention plate (316) of the upper case (310) may include a curved plate having a substantially same curvature as that of the second bobbin (120) of the bobbin (150).

A width of the rotation prevention plate (316) extended from the upper plate (312) of the upper case (310) has a substantially same width of the rotation prevention groove (126) formed between the adjacent pair of second bobbins (120), whereby the rotation prevention plate (316) extended from the upper plate (312) of the upper case (310) is brought into contact with a lateral surface facing the pair of second bobbins (120).

As a result, the rotation prevention plate (316) of the upper case (310) and the pair of second bobbins (120) of the bobbin (150) are mutually press-fitted, such that when the lens is coupled to the bobbin (150), the bobbin (150) can be prevented from rotating with the lens.

A gap for ascending and descending the bobbin (150) is formed between a distal end of the rotation prevention plate (316) of the upper case (310) and the upper surface of the first bobbin (110) of the bobbin (150).

The bottom case (320) is coupled to the upper case (310), and is also coupled to the base (600), whereby the bobbin (150) cannot rotate to a circumferential direction of the bobbin (150) but performs only up/down movement. The second elastic member (420) is interposed between the base (600) and the bottom case (320).

As apparent from the foregoing, the voice coil motor according to the present disclosure has an industrial applicability in that a bobbin is inhibited from rotating by rotation of a lens when the lens is rotated to be mounted to the bobbin, whereby generation of bad assembly can be avoided by preventing an elastic member coupled to the bobbin from being damaged or broken.

The above-mentioned voice coil motor according to the present disclosure may, however, be embodied in many different forms and should not be construed as limited to the exemplary embodiments set forth herein. Thus, it is intended that embodiments of the present disclosure may cover the modifications and variations of this disclosure provided they come within the scope of the appended claims and their equivalents. While particular features or aspects may have been disclosed with respect to several embodiments, such features or aspects may be selectively combined with one or more other features and/or aspects of other embodiments as may be desired.

What is claimed is:

1. A voice coil motor, comprising:
a mover including a bobbin including a lower bobbin portion having a lens secured therein and a plurality of upper bobbin portions protruded from the lower bobbin portion in a direction parallel to an optical axis of the lens, and a coil secured to a periphery of the bobbin;
a stator including a yoke fixing at least one magnet facing the coil; and
an elastic member coupled to the bobbin and the yoke, and elastically supporting the bobbin,
wherein the yoke comprises an upper plate, a lateral plate, and a plurality of rotation prevention plates,
wherein the upper plate has an opening for exposing the bobbin, and the lateral plate is bent from the upper plate, and the rotation prevention plates are bent from the upper plate to face the lateral plate,
wherein the plurality of upper bobbin portions is intermittently protruded from an upper surface of the lower bobbin portion, and the plurality of upper bobbin portions are separated from each other so that each of the plurality of upper bobbin portions only contacts the bobbin at the upper surface of the lower bobbin portion,
wherein each of the plurality of rotation prevention plates of the yoke has a first height, and each of the plurality of upper bobbin portions has a second height taller than the first height,
wherein the rotation prevention plates and the plurality of upper bobbin portions are configured to inhibit the bobbin from rotating, and
wherein the voice coil motor is configured such that a gap for ascending and descending the bobbin is formed between a distal end of each of the rotation prevention plates and the upper surface of the lower bobbin portion facing each of the rotation prevention plates.

2. The voice coil motor of claim 1, wherein a lateral portion of each of the rotation prevention plates is extended in a direction radially inward with respect to the opening of the yoke, and wherein each of the rotation prevention plates of the yoke is extended downwardly such that it is disposed in a rotation prevention groove of a plurality of rotation prevention grooves formed in the bobbin.

3. The voice coil motor of claim 1, further comprising a case having an opening corresponding to the bobbin.

4. The voice coil motor of claim 1, wherein an inner lateral surface of the lower bobbin portion takes the shape of a cylinder, and inner lateral surfaces of the plurality of upper bobbin portions takes the shape of a cylinder having a substantially same curvature as that of the lower bobbin portion.

5. The voice coil motor of claim 2, wherein each of the plurality of rotation prevention grooves is spaced apart at equidistance.

6. The voice coil motor of claim 1, wherein a thickness of each of the plurality of upper bobbin portions is thinner than that of the lower bobbin portion.

7. The voice coil motor of claim 1, wherein each of the rotation prevention plates comprises a curved plate having a substantially same curvature as that of the lower bobbin portion.

8. The voice coil motor of claim 1, wherein each of the plurality of upper bobbin portions comprises a boss protruded from an upper surface thereof and coupled to the first elastic member.

9. The voice coil motor of claim 3, wherein the case comprises an upper plate having an opening for exposing the bobbin.

10. The voice coil motor of claim 1, wherein the rotation prevention plate faces the upper bobbin portion.

11. A voice coil motor comprising:
a mover including a bobbin including a lower bobbin portion having a lens secured therein, a plurality of upper bobbin portions protruded from an upper surface of the lower bobbin portion, in a direction parallel to an optical axis of the lens, and a coil secured to a periphery of the bobbin, wherein the plurality of upper bobbin portions are separated from each other so that each of the plurality of upper bobbin portions only contacts the bobbin at the upper surface of the lower bobbin portion;
a stator including at least one magnet facing the coil;
a yoke fixing the at least one magnet; and
an elastic member supporting the bobbin, wherein the elastic member comprises an upper elastic member coupled to the plurality of upper bobbin portions and two lower elastic members coupled to the lower bobbin portion, wherein the yoke comprises an upper plate, a lateral plate, and a plurality of rotation prevention plates, wherein the upper plate of the yoke has an opening for exposing the bobbin, and the lateral plate is extended from and integrally formed with four edges of the upper plate, and the rotation prevention plates of the yoke are extended from an inner lateral surface formed by the opening of the upper plate to face the lateral plate, wherein each of the rotation prevention plates of the yoke has a first height, and each of the plurality of upper bobbin portions has a second height taller than the first height, wherein a plurality of rotation prevention grooves is formed in the bobbin and each of the rotation prevention plates is disposed in a rotation prevention groove of the plurality of rotation prevention grooves and faces to a portion of the lower bobbin portion, wherein the rotation prevention plates and the rotation prevention grooves are configured to inhibit the bobbin from rotating, wherein the magnet is fixed in the yoke at a position corresponding to each of the plurality of rotation prevention plates, and wherein the voice coil motor is configured such that a gap for ascending and descending the bobbin is formed between a distal end of each of the rotation prevention plates and the upper surface of the lower bobbin portion facing each of the rotation prevention plates.

12. The voice coil motor of claim 1, wherein the plurality of upper bobbin portions comprises a first upper bobbin portion and second upper bobbin portion adjacent to the first upper bobbin portion, wherein one of the rotation prevention plates is disposed between the first upper bobbin portion and the second upper bobbin portion and wherein both lateral surfaces of the rotation prevention plate are configured to be brought into contact with lateral surfaces of the first and second upper bobbin portions, respectively.

13. The voice coil motor of claim 1, wherein a length between an outer lateral surface of each of the plurality of upper bobbin portions and an optical axis of the lens is longer than a length between an inner lateral surface of each of the plurality of rotation prevention plates and an optical axis of the lens.

14. The voice coil motor of claim 1, wherein a thickness of each of the plurality of upper bobbin portions is thinner than that of the lower bobbin portion.

15. The voice coil motor of claim 1, further comprising a case including a bottom case coupled with the bobbin and upper case coupled to the bottom case and having a portion that is correspondingly opened to the bobbin.

16. The voice coil motor of claim 1, wherein the elastic member comprises an upper elastic member coupled to the plurality of upper bobbin portions and two lower elastic members coupled to the lower bobbin portion.

17. The voice coil motor of claim 11, wherein the plurality of upper bobbin portions is intermittently protruded from the upper surface of the lower bobbin portion, and wherein the rotation prevention plates and the plurality of upper bobbin portions are configured to inhibit the bobbin from rotating.

* * * * *